(12) United States Patent
Chang et al.

(10) Patent No.: US 8,630,477 B2
(45) Date of Patent: Jan. 14, 2014

(54) ELECTRONIC DEVICE AND METHOD FOR OUTPUTTING MEASUREMENT DATA

(75) Inventors: Chih-Kuang Chang, New Taipei (TW); Xin-Yuan Wu, Shenzhen (CN); Wei-Quan Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 328 days.

(21) Appl. No.: 13/245,880

(22) Filed: Sep. 27, 2011

(65) Prior Publication Data

US 2012/0237113 A1 Sep. 20, 2012

(30) Foreign Application Priority Data

Mar. 16, 2011 (CN) .......................... 2011 1 0063131

(51) Int. Cl.
*G06K 9/00* (2006.01)
*G06K 9/46* (2006.01)
*G06K 9/60* (2006.01)
*G01B 7/00* (2006.01)

(52) U.S. Cl.
USPC ........... 382/141; 382/154; 382/190; 382/305; 702/155

(58) Field of Classification Search
USPC .......... 382/141, 154, 190, 305; 345/419, 589, 345/440, 467, 441; 702/155, 168; 700/175, 700/187; 711/114; 707/821, 828; 703/1
See application file for complete search history.

(56) References Cited

U.S. PATENT DOCUMENTS

| | | | | |
|---|---|---|---|---|
| 4,901,253 A | * | 2/1990 | Iwano et al. | 345/419 |
| 5,627,771 A | * | 5/1997 | Makino | 702/155 |
| 7,640,219 B2 | * | 12/2009 | Perrizo | 706/20 |
| 7,880,899 B2 | * | 2/2011 | Horita et al. | 356/608 |
| 8,046,392 B2 | * | 10/2011 | Ueoka et al. | 707/828 |
| 8,320,660 B2 | * | 11/2012 | Ishiyama | 382/154 |
| 8,560,269 B2 | * | 10/2013 | Fischer | 702/179 |

* cited by examiner

*Primary Examiner* — Sheela Chawan
(74) *Attorney, Agent, or Firm* — Altis Law Group, Inc.

(57) ABSTRACT

A method outputs measurement data automatically using an electronic device. The method obtains measurement data of feature elements from a two dimensional (2D) image of a measured object, determines a type of measurement applied to each feature element, obtains feature elements from planes of a three dimensional (3D) image of the measured object, and maps each of the obtained feature elements in the 3D image to the 2D image. The method further obtains sequential marked numbers from the 2D image, determines a feature element which is nearest to any marked number from the mapped feature elements, determines an output axis for each of the determined feature elements, and outputs measured results and measurement codes of the determined feature elements by reference to the measurement data, the type of measurement and the output axis of each determined feature element.

19 Claims, 10 Drawing Sheets

| Marked number | Element name | Axis | Measured result | Reference value | Upper deviation | Lower deviation |
|---|---|---|---|---|---|---|
| 1 | SN1 | X | 7.8916 | 7.9000 | 0.1000 | 0.1000 |
| 2 | SN1 | Y | 9.6974 | 9.7000 | 0.1000 | 0.1000 |
| ... | | | | | | |

FIG. 9

```
Auto =DIMENSION/LOCATION,X,S4,-19.361,0.1000,-0.1000

Auto =DIMENSION/LOCATION,Y,S4,19.820,0.1000,-0.1000

Auto =DIMENSION/LOCATION,Z,S4,30.000,0.1000,-0.1000

Auto =DIMENSION/LOCATION,R,S4,5.692,0.1000,-0.1000

Auto =DIMENSION/LOCATION,D,S4,11.384,0.1000,-0.1000

ELECTRONIC DEVICE AND METHOD FOR OUTPUTTING MEASUREMENT DATA

BACKGROUND

1. Technical Field

Embodiments of the present disclosure relate to measurement technology, and particularly to an electronic device and method for outputting measurement data using the electronic device.

2. Description of Related Art

Measurement is an important phase in manufacturing and is closely related to product quality. In recent years, point cloud obtaining devices have been used to obtain a point cloud of an object by scanning a large number of points on a surface of the object, processing the data in the point cloud, and subsequently extracting boundary elements including boundary points and boundary characteristics of the object, in order to form an image of the profile of the object. However, many image measuring methods cannot automatically output the measurement data of a measured object. It is necessary to select feature elements from the measured object manually, and manually select a type of measurement, an output axis and a tolerance range of the feature element to output the desired measurement data. Therefore, a more efficient method for outputting the results of measurements is desired.

BRIEF DESCRIPTION OF THE DRAWINGS

FIG. 9 is an exemplary schematic diagram of the results of measurement of some feature elements of the measured object.

FIG. 10 is an exemplary schematic diagram of measurement codes of the feature elements of the measured object.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
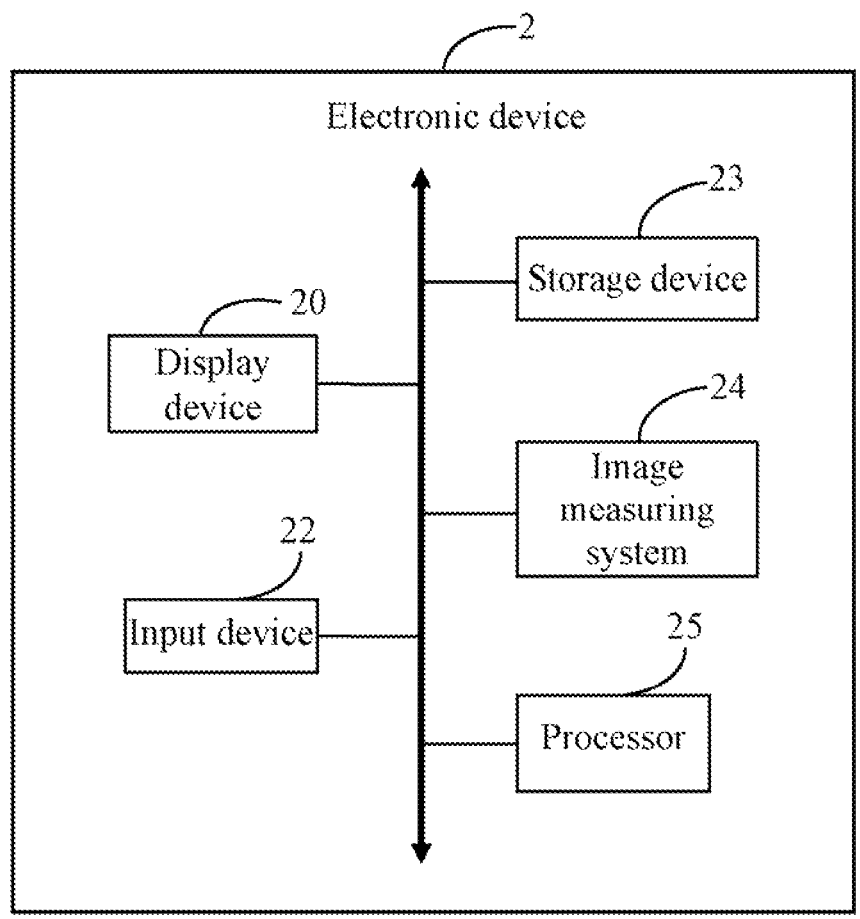
FIG. 1 is a block diagram of one embodiment of an electronic device including an image measuring system.

FIG. 1 is a block diagram of one embodiment of an electronic device 2 including an image measuring system 24. In the embodiment, the electronic device 2 further includes a display device 20, an input device 22, a storage device 23, and at least one processor 25. The electronic device 2 may be a computer, a server, or any other computing device. The image measuring system 24 is used to automatically obtain types of measurements, output axes, and tolerance ranges of the various types of feature elements of an object to be measured ("measured object"), and output the results of measurements ("measured results") and measurement codes relating to all the feature elements on the display device 20. A detailed description will be given in the following paragraphs. In one embodiment, a "feature element" may be a line, a plane, a circle, a cylinder, or a sphere, but the disclosure is not limited thereto.

The display device 20 displays the measurement data of the measured object, and the input device 22 may be a mouse or a keyboard used to input computer readable data. The storage device 23 may store a two dimensional (2D) image of the measured object, a three dimensional (3D) image of the measured object, and other measurement data of the measured object.

Figure 2:
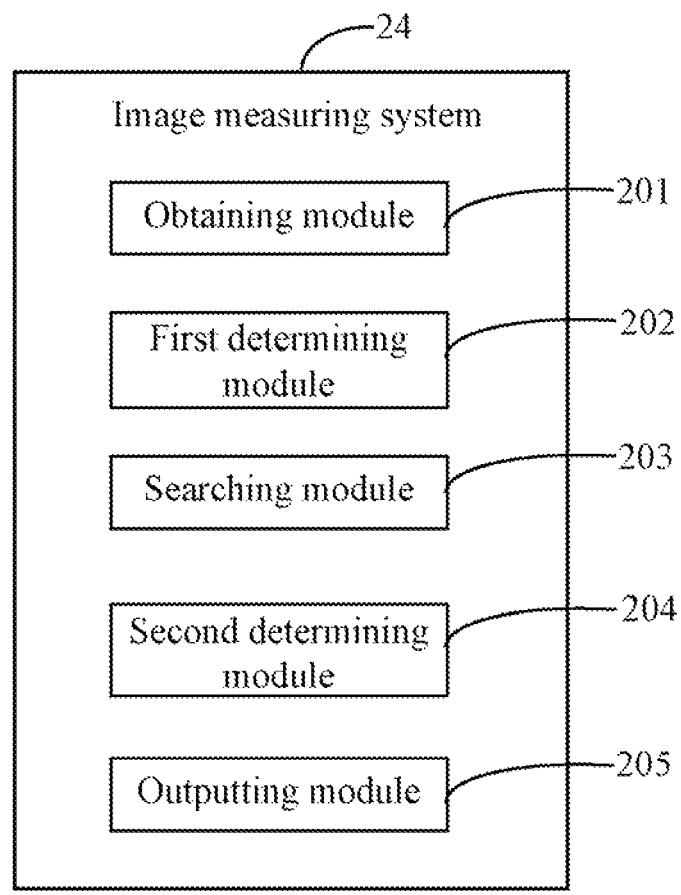
FIG. 2 is a block diagram of function modules of the image measuring system included in the electronic device of FIG. 1.

FIG. 2 is a block diagram of function modules of the image measuring system 24 included in the electronic device 2. In one embodiment, the image measuring system 24 may include one or more modules, for example, an obtaining module 201, a first determining module 202, a searching module 203, a second determining module 204, and an outputting module 205. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives. The one or more modules 201-205 may comprise computerized code in the form of one or more programs that are stored in the storage device 23 or memory of the electronic device 2. The computerized code includes instructions that are executed by the at least one processor 25 to provide functions for the one or more modules 201-205.

Figure 3:
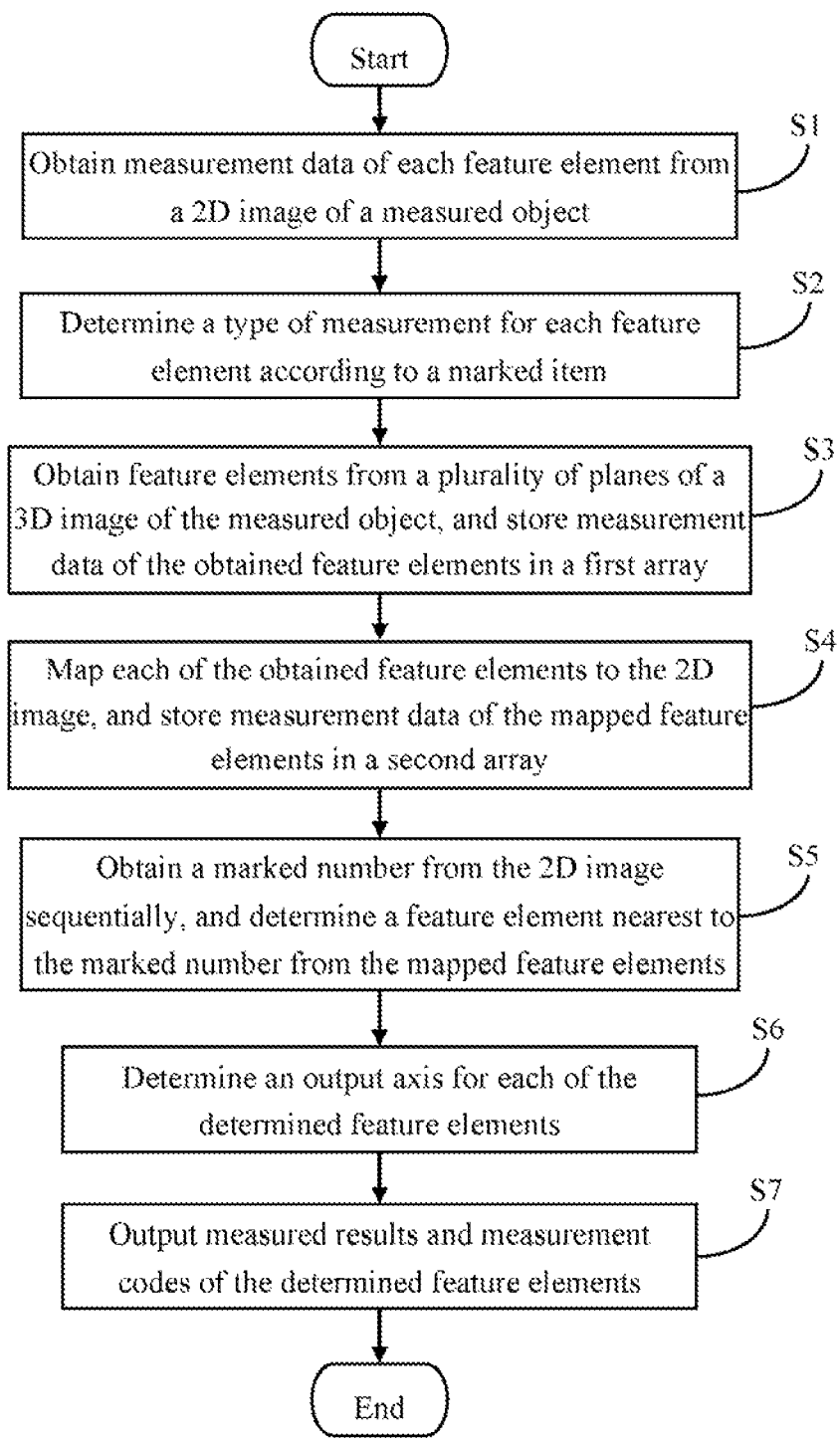
FIG. 3 is a flowchart of one embodiment of a method for outputting measurement data automatically using the electronic device of the FIG. 1.

FIG. 3 is a flowchart of one embodiment of a method for outputting measurement data automatically using the electronic device 2. Depending on the embodiment, additional blocks may be added, others removed, and the ordering of the blocks may be changed.

In block 51, the obtaining module 201 obtains a 2D image of an object (hereinafter refer to as "the measured object") having known measurements from the storage device 23 of the electronic device 2, and obtains measurement data concerning the feature elements in the 2D image of the measured object. In one embodiment, the 2D image of the measured object may be a computer aided design (CAD) image. The measurement data for each feature element may include, but is not limited to, a name, a preset tolerance range, a marked item, and the already-known measurements (i.e., measured results) for each feature element. For example, the measured results may be a length of a feature element along an X-axis or on a Y-axis.

In one embodiment, the tolerance range may be preset as a number range, for example, [−0.5, +0.5]. The marked item is used to record a type of the measurement of the feature element. For example, the marked item of the feature element may include, but is not limited to, a distance or an angle between two adjacent feature elements, a distance from the feature element to the X-axis, or a distance from the feature element to the Y-axis.

In block S2, the first determining module 202 determines a type of measurement for each feature element of the measured object according to the marked item of each feature element.

In one embodiment, if the marked item of the feature element is the distance between two adjacent feature elements, the type of measurement applied to the feature element is referred to as measuring the distance between two adjacent feature elements. If the marked item of the feature element is the angle between two adjacent feature elements, the type of measurement applied to the feature element is referred to as measuring the angle between two adjacent feature elements. If the marked item of the feature element is the distance from the feature element to the X-axis, the type of measurement is referred to as measuring the distance from the feature element to the X-axis. If the marked item of the feature element is the distance from the feature element to the Y-axis, the type of measurement is referred to as measuring the distance from the feature element to the Y-axis.

Figure 5:
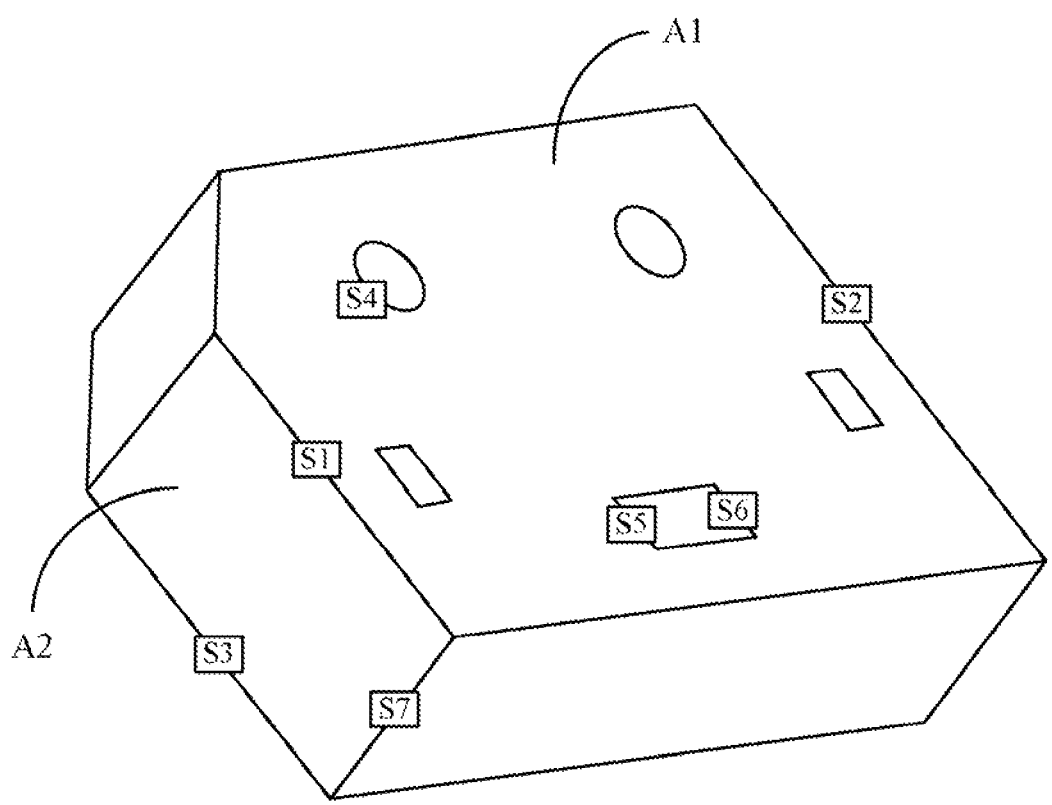
FIG. 5 is an exemplary schematic diagram of a three dimensional (3D) image of a measured object.

In block S3, the searching module 203 obtains a 3D image of the measured object from the storage device 23, and further obtains feature elements from a plurality of planes of the 3D image of the measured object, then stores measurement data of the obtained feature elements in a first array. As shown in FIG. 5, "A1" represent a first plane of the 3D image of the measured object, "A2" represent a second plane of the 3D image of the measured object, where the first plane "A1" includes the feature elements of S1, S2, S4, S5, and S6.

Figure 6:
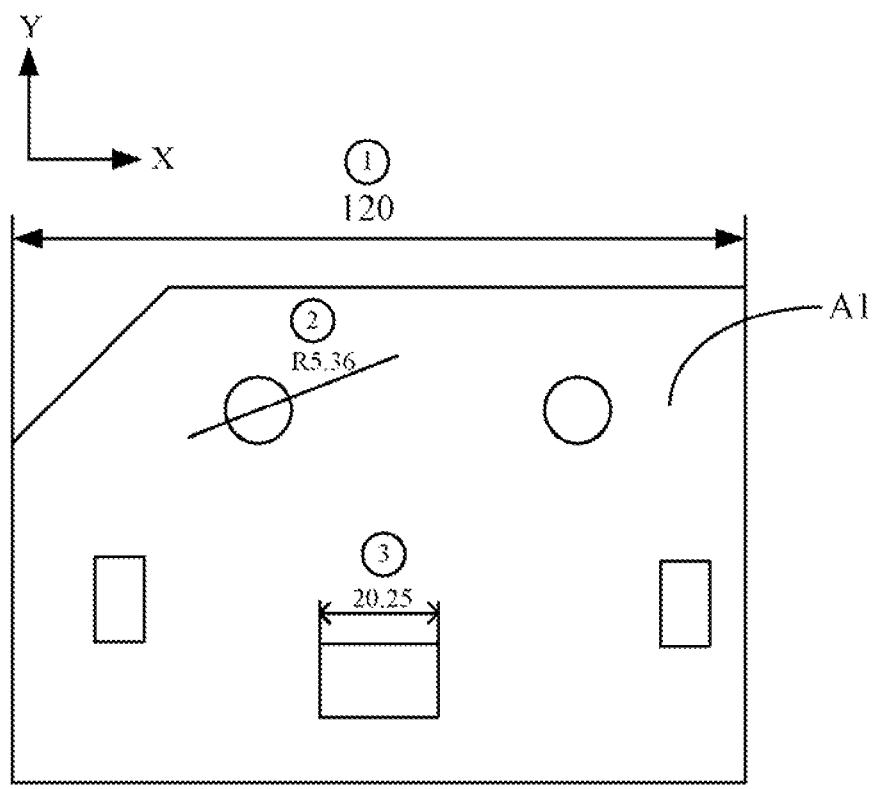
FIG. 6 is an exemplary schematic diagram of a plurality of feature elements mapped from a first plane of the 3D image in FIG. 5.

In block S4, the searching module 203 maps each of the obtained feature elements in the 3D image of the measured object to the 2D image of the measured object, so as to obtain a plurality of mapped feature elements on the 2D image of the measured object. In another embodiment, the searching module 203 further stores measurement data of the mapped feature elements in a second array. An exemplary schematic diagram of a plurality of feature elements mapped from the first plane "A1" of the 3D image is shown in FIG. 6.

Figure 7:
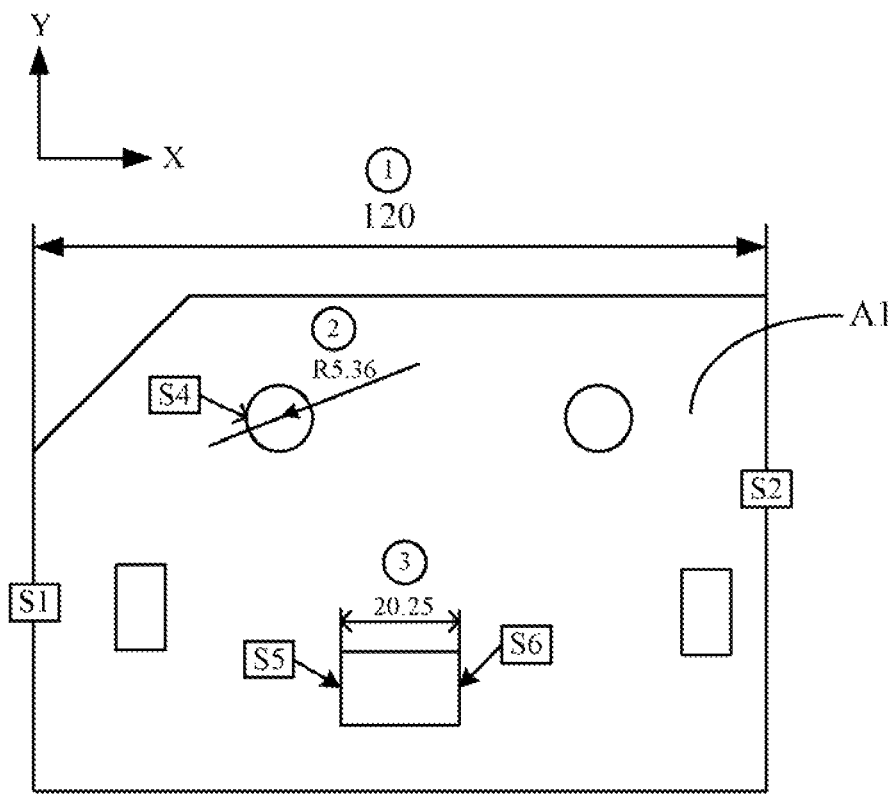
FIG. 7 is an exemplary schematic diagram of a plurality of marked numbers in the 2D image of the measured object.

In block S5, the searching module 203 obtains a marked number from the 2D image of the measured object sequentially, and determines a feature element nearest to the marked number from the mapped feature elements according to a marked direction of the marked number. In one embodiment, the marked direction is an angle or an orientation along which the measurement was taken. An exemplary schematic diagram of a plurality of marked numbers in the 2D image of the measured object is shown in FIG. 7, such as the encircled digits 1-3 and the corresponding quantities. For example, the marked direction of the first marked number is along the X-axis, thus, the feature elements nearest to the first marked number along the X-axis are S1 and S2. In a similar way, the feature elements nearest to the second marked number is S4, and the feature elements nearest to the third marked number are S5 and S6.

In block S6, the second determining module 204 determines an output axis for each of the determined feature elements according to the marked direction of each marked number in the 2D image of the measured object. In one embodiment, the output axis of the determined feature element is a specified axis (e.g., X-axis) which is used to output the measured results of the determined feature element. For example, if the output axis of a feature element is the X-axis, the outputting module 205 outputs the measured results of the feature element along the X-axis.

Figure 8:
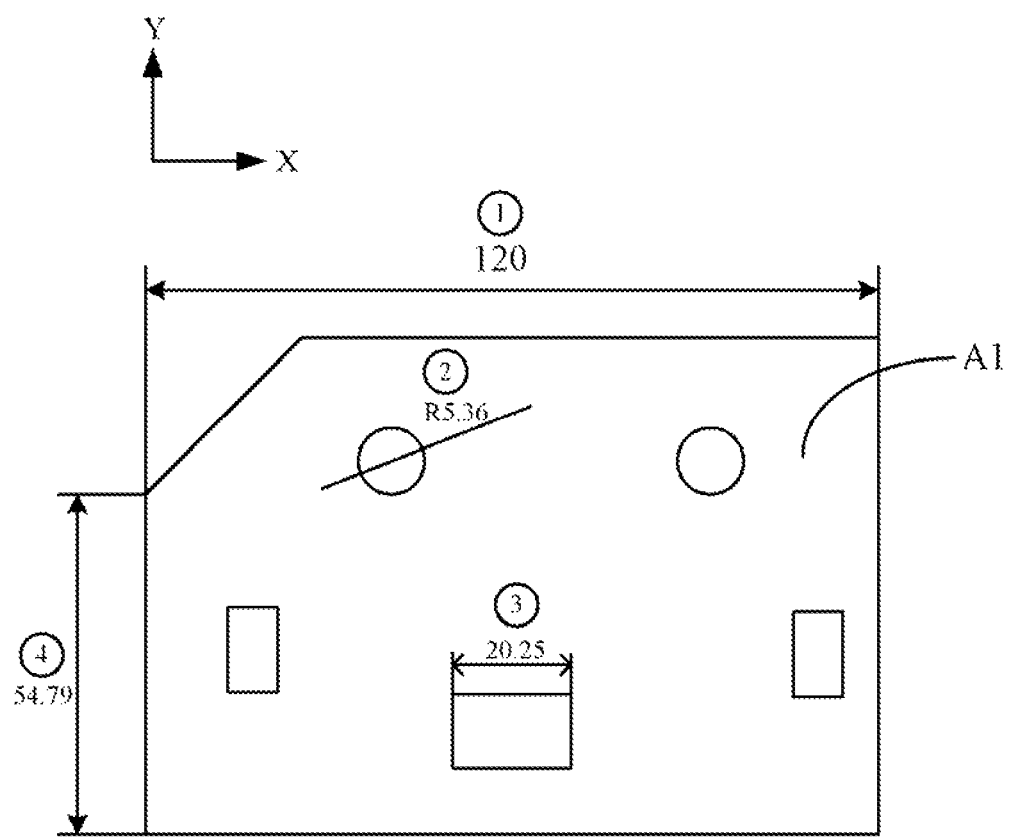
FIG. 8 is an exemplary schematic diagram of the determining of an output axis for each feature element according to a marked direction of each marked number in FIG. 7.

In an exemplary embodiment, as shown in FIG. 8, the marked direction of the first marked number is the X-axis, and the output axis of the feature elements S1 and S2, which are nearest to the first marked number, is the X-axis.

In block S7, the outputting module 205 outputs measured results (e.g., as shown in FIG. 9) and measurement codes (e.g., as shown in FIG. 10) of the determined feature elements by reference to the measurement data, the type of measurement and the output axis of each determined feature element.

Figure 4:
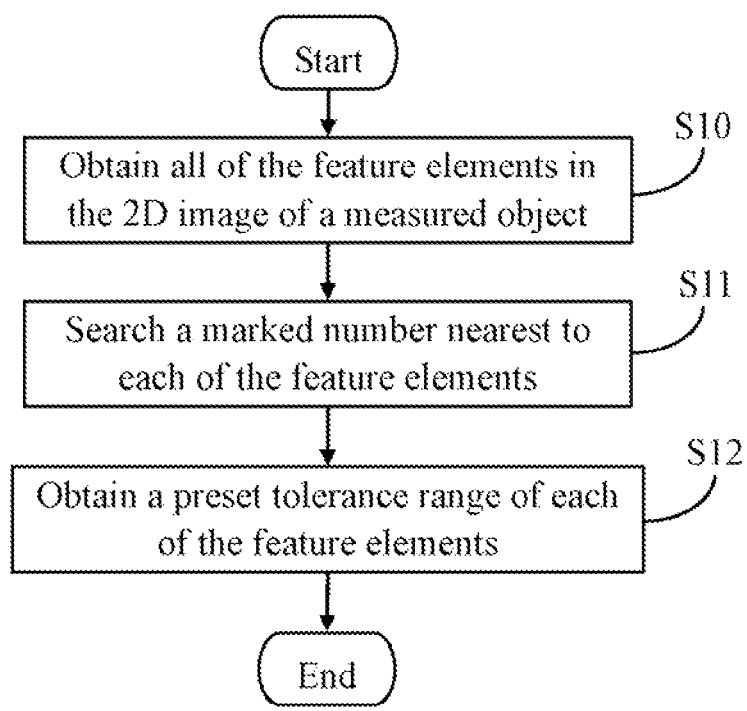
FIG. 4 is a detailed flowchart of block 51 in FIG. 3.

FIG. 4 is a detailed flowchart of block S1 in FIG. 3. Depending on the embodiment, additional blocks may be added, others removed, and the ordering of the blocks may be changed.

In block S10, the obtaining module 201 obtains all of the feature elements in the 2D image of the measured object.

In block S11, the obtaining module 201 searches for a marked number which is nearest to each feature element. An exemplary schematic diagram of a plurality of marked numbers in the measured object is shown in FIG. 7, such as the encircled digits 1-3, and the corresponding quantities.

In block S12, the data obtaining module 201 obtains a preset tolerance range for each of the feature elements according to the type of measurement applied to each feature element. For example, the tolerance range may be preset as a number range of [−0.5, +0.5].

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computerized-implemented method for outputting measurement data using an electronic device, the method comprising:

obtaining a two dimensional (2D) image of a measured object from a storage device of the electronic device, and obtaining measurement data of feature elements from the 2D image, the measurement data of each feature element comprising a marked item and measured results of each feature element;

determining a type of measurement for each feature element according to the marked item of each feature element;

obtaining a three dimensional (3D) image of the measured object from the storage device of the electronic device, and obtaining feature elements from a plurality of planes of the 3D image of the measured object;

mapping each of the obtained feature elements in the 3D image to the 2D image to obtain a plurality of mapped feature elements on the 2D image;

obtaining a marked number from the 2D image sequentially, and determining a feature element nearest to the marked number from the mapped feature elements according to a marked direction of the marked number;

determining an output axis for each of the determined feature elements according to the marked direction of each marked number in the 2D image; and outputting measured results and measurement codes of the determined feature elements by reference to the measurement data, the type of measurement and the output axis of each determined feature element.

2. The method according to claim 1, further comprising:
   storing the measurement data of the obtained feature elements in a first array; and
   storing the measurement data of the mapped feature elements in a second array.

3. The method according to claim 1, wherein the measurement data of each feature element further comprise a name and a preset tolerance range of each feature element.

4. The method according to claim 1, wherein the marked item of each feature element is a distance between two adjacent feature elements, an angle between two adjacent feature elements, a distance from each feature element to an X-axis, or a distance form each feature element to a Y-axis.

5. The method according to claim 1, wherein the 2D image of the measured object is a computer aided design (CAD) image.

6. The method according to claim 1, wherein the output axis of each determined feature element is a specified axis that is used to output the measured results of the determined feature element.

7. An electronic device, comprising:
   a storage device;
   at least one processor; and
   one or more modules that are stored in the storage device and are executed by the at least one processor, the one or more modules comprising instructions:
   to obtain a two dimensional (2D) image of a measured object from the storage device, and obtain measurement data of feature elements from the 2D image, the measurement data of each feature element comprising a marked item and measured results of each feature element;
   to determine a type of measurement for each feature element according to the marked item of each feature element;
   to obtain a three dimensional (3D) image of the measured object from the storage device, and obtain feature elements from a plurality of planes of the 3D image;
   to map each of the obtained feature elements in the 3D image to the 2D image to obtain a plurality of mapped feature elements on the 2D image;
   to obtain a marked number from the 2D image sequentially, and determine a feature element nearest to the marked number from the mapped feature elements according to a marked direction of the marked number;
   to determine an output axis for each of the determined feature elements according to the marked direction of each marked number in the 2D image; and
   to output measured results and measurement codes of the determined feature elements by reference to the measurement data, the type of measurement and the output axis of each determined feature element.

8. The electronic device according to claim 7, wherein the one or more modules further comprise instructions of:
   storing the measurement data of the obtained feature elements in a first array; and
   storing the measurement data of the mapped feature elements in a second array.

9. The electronic device according to claim 7, wherein the measurement data of each feature element further comprise a name and a preset tolerance range of each feature element.

10. The electronic device according to claim 7, wherein the marked item of each feature element is a distance between two adjacent feature elements, an angle between two adjacent feature elements, a distance from each feature element to an X-axis, or a distance form each feature element to a Y-axis.

11. The electronic device according to claim 7, wherein the 2D image of the measured object is a computer aided design (CAD) image.

12. The electronic device according to claim 7, wherein the output axis of each determined feature element is a specified axis that is used to output the measured results of the determined feature element.

13. A non-transitory storage medium having stored thereon instructions that, when executed by a processor of an electronic device, causes the electronic device to perform a method for outputting measurement data, the method comprising:
   obtaining a two dimensional (2D) image of a measured object from a storage device of the electronic device, and obtaining measurement data of feature elements from the 2D image, the measurement data of each feature element comprising a marked item and measured results of each feature element;
   determining a type of measurement for each feature element according to the marked item of each feature element;
   obtaining a three dimensional (3D) image of the measured object from the storage device, and obtaining feature elements from a plurality of planes of the 3D image;
   mapping each of the obtained feature elements in the 3D image to the 2D image to obtain a plurality of mapped feature elements on the 2D image;
   obtaining a marked number from the 2D image sequentially, and determining a feature element nearest to the marked number from the mapped feature elements according to a marked direction of the marked number;
   determining an output axis for each of the determined feature elements according to the marked direction of each marked number in the 2D image; and
   outputting measured results and measurement codes of the determined feature elements by reference to the measurement data, the type of measurement and the output axis of each determined feature element.

14. The non-transitory storage medium according to claim 13, wherein the method further comprises:
   storing the measurement data of the obtained feature elements in a first array; and
   storing the measurement data of the mapped feature elements in a second array.

15. The non-transitory storage medium according to claim 13, wherein the measurement data of each feature element further comprise a name and a preset tolerance range of each feature element.

16. The non-transitory storage medium according to claim 13, wherein the marked item of each feature element is a distance between two adjacent feature elements, an angle between two adjacent feature elements, a distance from each feature element to an X-axis, or a distance form each feature element to a Y-axis.

17. The non-transitory storage medium according to claim 13, wherein the 2D image of the measured object is a computer aided design (CAD) image.

18. The non-transitory storage medium according to claim 13, wherein the output axis of each determined feature element is a specified axis that is used to output the measured results of the determined feature element.

19. The non-transitory storage medium according to claim 13, wherein the medium is selected from the group consisting of a hard disk drive, a compact disc, a digital video disc, and a tape drive.

* * * * *